United States Patent [19]
Hunsbedt et al.

[11] Patent Number: 5,043,135
[45] Date of Patent: Aug. 27, 1991

[54] METHOD FOR PASSIVE COOLING LIQUID METAL COOLED NUCLEAR REACTORS, AND SYSTEM THEREOF

[75] Inventors: Anstein Hunsbedt, Los Gatos; Herbert J. Busboom, San Jose, both of Calif.

[73] Assignee: General Electric Company, San Jose, Calif.

[21] Appl. No.: 353,423

[22] Filed: May 18, 1989

[51] Int. Cl.$^5$ .............................................. G21C 15/18
[52] U.S. Cl. ................................................ 376/299
[58] Field of Search ............... 376/299, 298, 293, 294, 376/295, 283, 292

[56] References Cited

U.S. PATENT DOCUMENTS

| 3,261,756 | 7/1966 | Ripley | 376/454 |
| 4,678,626 | 7/1987 | Germer | 376/299 |
| 4,753,771 | 6/1988 | Conway | 376/299 |

FOREIGN PATENT DOCUMENTS

| 2506063 | 5/1981 | France | 376/299 |
| 217296 | 9/1988 | Japan | 376/293 |

OTHER PUBLICATIONS

"On the Presentation of Performance Data for Enhanced Tubes Used in Shell-and-Tube Heat Exchangers", by Marner et al, *Transactions of the ASME*, vol. 105, May 1983, pp. 358–365.

"General Correlations for Pressure Drop and Heat Transfer for Single-Phase Turbulent Flow in Internally Ribbed Tubes": by Ravigururajan et al., Augmentation of Heat Transfer in Energy Systems, American Society of Mechanical Engineers, HTD-vol. 52, Nov. 17-22, 1985, pp. 9–20.

"Heat Transfer and Friction in Tubes with Repented-Rib Roughness", by Wess et al, 7/1971, pp. 601–615.

"Cascaded-Blockbody Heat Radiators", Marshall Space Flight Center, Alabama, *NASA Tech Briefs*, Jun. 1987, pp. 33–34.

*Primary Examiner*—Daniel D. Wasil
*Attorney, Agent, or Firm*—Robert R. Schroeder

[57] ABSTRACT

A liquid metal cooled nuclear reactor having a passive cooling system for removing residual heat resulting from fuel decay during reactor shutdown. The passive cooling system comprises a plurality of partitions surrounding the reactor vessel in spaced apart relation forming intermediate areas for circulating heat transferring fluid which remove and carry away heat from the reactor vessel.

20 Claims, 3 Drawing Sheets

METHOD FOR PASSIVE COOLING LIQUID METAL COOLED NUCLEAR REACTORS, AND SYSTEM THEREOF

The Government of the United States has rights in this invention under Contract No. DE-AC03-85NE 37937.

FIELD OF THE INVENTION

This invention relates to an improvement in the passive cooling of liquid metal cooled nuclear reactors having a pool of liquid metal coolant with the heat generating fissionable fuel core substantially immersed in the liquid metal pool, such as the system disclosed in U.S. Pat. No. 4,508,677, issued Apr. 2, 1985.

BACKGROUND OF THE INVENTION

In the operation of liquid sodium or sodium-potassium metal cooled nuclear reactors for power generation, it may be necessary to shut down the fission reaction of the fuel to deal with emergencies or carry out maintenance services. Reactor shut down is attained by inserting neutron absorbing control rods into the core of fissionable fuel to deprive the fuel of the needed fission producing neutrons. However decay of the fuel in the shut down reactor continues to produce heat in significant amounts which must be dissipated from the reactor unit.

The heat capacity of the liquid metal coolant and adjacent structure aid in dissipating the residual heat. However, the structural materials of the nuclear reactor may not be capable of safely withstanding prolonged high temperatures. For example the concrete of the walls of the typical housing silo may splay and crack when subjected to high temperatures. Accordingly auxiliary cooling systems are commonly utilized to safely remove heat from the nuclear reactor structure during shut down.

Conventional nuclear reactors have utilized a variety of elaborate energy driven cooling systems to dissipate heat from the reactor. In many of the situations warranting a shutdown, the energy supply to the cooling systems make the cooling systems themselves subject to failure. For example, pumps and ventilation systems to cool the core may fail. Furthermore, if operator intervention is necessary, there are foreseeable scenarios in which the operator would be unable to provide the appropriate action. The most reliable and desirable cooling system would be a completely passive system which could continuously remove the residual heat generated after shutdown.

Liquid metal cooled reactors such as the modular type disclosed in U.S. Pat. No. 4,508,677, utilizing sodium or sodium-potassium as the coolant provides numerous advantages. Water cooled reactors operate at or near the boiling point of water. Any significant rise in temperature results in the generation of steam and increased pressure. By contrast, sodium or sodium-potassium has an extremely high boiling point, in the range of 1800 degrees Fahrenheit at one atmosphere pressure. The normal operating temperature of the reactor is in the range of about 900 degrees Fahrenheit. Because of the high boiling point of the liquid metal, the pressure problems associated with water cooled reactors and the steam generated thereby are eliminated. The heat capacity of the liquid metal permits the sodium or sodium-potassium to be heated several hundred degrees Fahrenheit without danger of materials failure in the reactor.

The reactor vessels for pool-type liquid-metal cooled reactors are essentially open top cylindrical tanks without any perforations to interrupt the integrity of the vessel walls. Sealing of side and bottom walls is essential to prevent the leakage of liquid metal from the primary vessel. The vessel surfaces must also be accessible of the rigorous inspections required by safety considerations.

In the typical sodium cooled reactor, two levels of sodium loops are used. Usually, a single primary loop and two or more secondary loops are used. The primary loop contains very radioactive sodium which is heated by the fuel rods. The primary loop passes through heat exchangers to exchange the heat with one of the non-radioactive secondary sodium loops. In general, sodium cooled reactors are designed to incorporate redundant secondary loops in the event of failure of one loop.

Upon shutdown of the reactor by fully inserting the control rods, residual heat continues to be produced and dissipated according to the heat capacity of the plant. Assuming that the reactor has been at full power for a long period of time, during the first hour following shutdown, an average of about 2% of full power continues to be generated. The residual heat produced continues to decay with time.

This invention comprises an improvement in the passive cooling system for removing shutdown decay heat from a liquid metal cooled nuclear reactor disclosed and claimed in U.S. Pat. No. 4,678,626, issued Dec. 2, 1985.

The disclosed contents of the above noted U.S. Pat. Nos. 4,508,677 and 4,678,626, comprising related background art, are incorporated herein by reference.

SUMMARY OF THE INVENTION

This invention comprises a method for improving shut down, passive heat removal system for liquid metal cooled nuclear reactors which transfers reactor decay and sensible heat from the fuel core and liquid metal coolant by means of the inherent thermal energy transfer mechanisms of conduction, radiation, convection and natural convection of fluids out to the ambient atmosphere, and the improved system. The improved means of the invention is entirely passive and operates continuously through the inherent phenomenon of natural convection in fluids, conduction, convection, and thermal radiation.

The invention particularly includes an improved means for enhancing the efficiency of thermal energy transfer from a metal surface to a fluid passing thereover. The improvement of the invention include providing surface configurations on the face of metal conduits through which cooling fluids pass.

In the event of a reactor shutdown, after the control rods are fully inserted into the fuel core, the heat generated by the fuel rods is transferred through the liquid sodium coolant to the reactor vessel wall, then across an inert gas gap to the surrounding containment vessel primarily by the mechanism of thermal radiation, with a small fraction of the heat transferred by conduction and convection in the contained inert gas. Surfaces of high thermal emissivity provided on the outside of the reactor vessel and the interior of the containment vessel increase the efficiency of the heat transfer.

Heat is then removed from the outside surface of the containment vessel partly by thermal radiation and partly by direct convection to the circulating air in the passage between the containment vessel and the shield.

Modular reactor vessels have approximately one third the diameter and are about the same height as conventional nuclear reactor vessels. In modular reactors, the ratio of the surface area to the power generated is approximately three times greater than the surface area to power ratio in a conventional and large reactor. This provides sufficient surface area over which the residual heat may be passively dissipated. The highly emissive exterior surfaces of the containment vessel also enhance the heat transfer. Thus, the present invention eliminates the necessity of redundant secondary sodium loops. A single secondary loop can function safely with the passive auxiliary cooling system as the alternative cooling mechanism.

OBJECTS OF THE INVENTION

It is a primary object of this invention to provide an improved passive cooling method and system for liquid metal cooled nuclear reactors for the removal of decay and sensible heat.

It is also an object of this invention to improve the efficiency of heat transfer in passive cooling of liquid metal cooled nuclear reactors comprising a core of fissionable fuel substantially immersed within a pool of liquid metal coolant.

It is another object of this invention to provide an improved passive cooling system for liquid metal cooled nuclear reactors comprising a method of enhancing thermal energy transfer from structural components to a cooling fluid heat transferring medium passing in contact therewith, by means of convection.

It is a further object of this invention to provide a heat removing system for liquid metal cooled nuclear reactors which is entirely passive and operates continuously by the inherent phenomenon of natural convection in fluids, conduction, convection, and thermal radiation.

It is a still further object of this invention to provide an improvement in passive systems for removing decay and sensible heat produced during shut down in a liquid metal cooled nuclear reactor utilizing a circulating fluid medium pass in contact over the surface of metal components.

DETAIL DESCRIPTION OF THE INVENTION

Pool-type liquid-metal cooled reactors have sufficient surface area to accommodate dissipation of residual heat during reactor shutdown events. Overall, the reactor system has a relatively small heat capacity. The problem remaining is to dissipate the residual heat without significantly damaging the containment structures. A completely passive cooling system eliminates reliance on energy driven pumps and fans and the need for operator intervention. At the same time, the containment vessel itself must not be structurally modified due to the size constraints on modular reactors, and the necessity of a smooth, unperforated tank structure to prevent any areas where stresses might accumulate. Strict inspection requirements also require that the containment vessel be simple to inspect both during manufacture and erection of the structure.

Figures 1, 2:
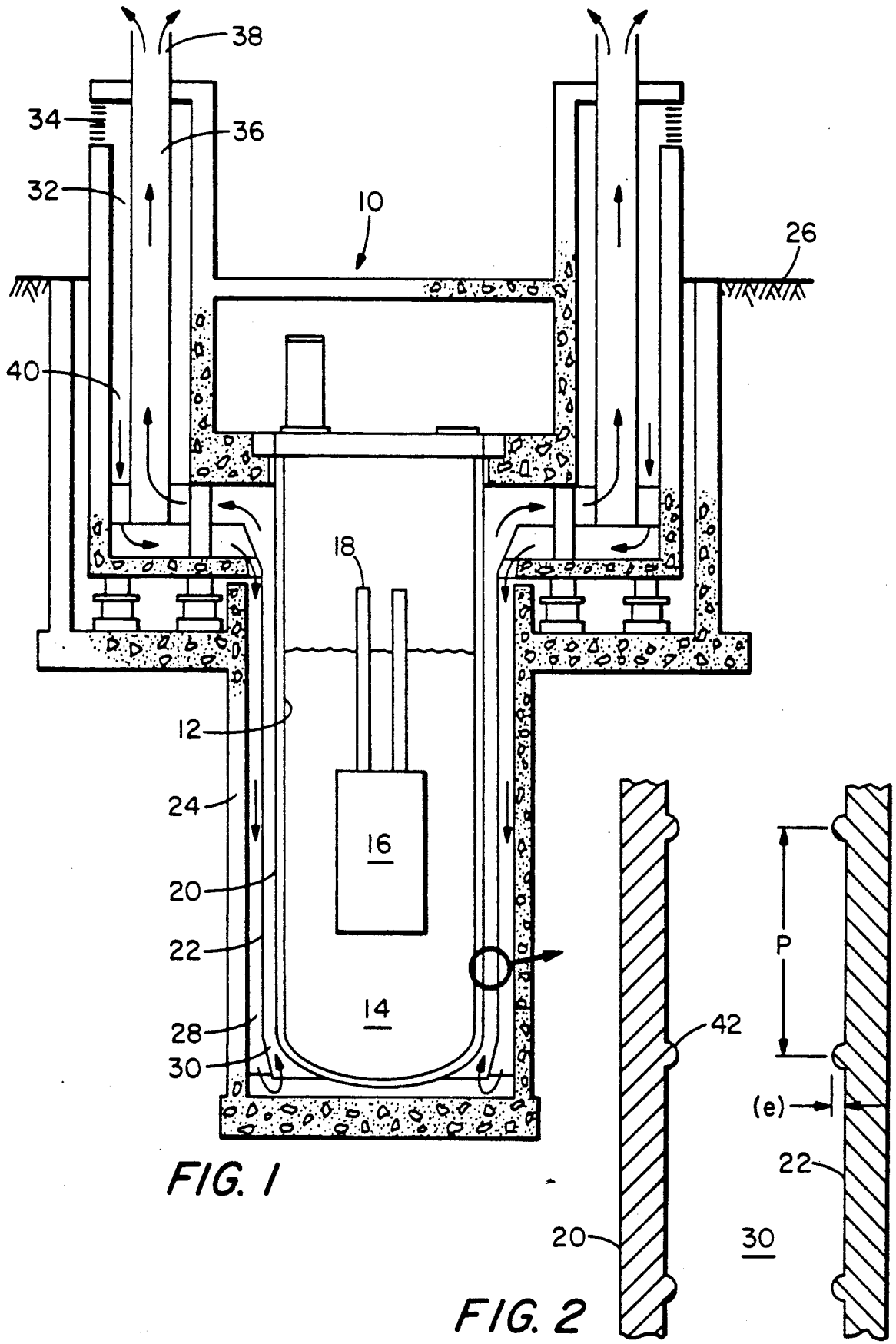
FIG. 1 is a schematic illustration of a liquid metal cooled nuclear reactor plant in cross-section.
FIG. 2 is a cross-sectional view of a portion of the reactor structure of a liquid metal cooled nuclear reactor plant showing a variation of the invention.

Referring to FIG. 1 of the drawings, an embodiment of a pool-type, liquid metal cooled nuclear reactor plant 10, comprises a reactor vessel 12, typically consisting of a cylindrical tank positioned with its longitudinal axis extending vertically upright, and having an open upper end provided with a removable cover. Reactor vessel 12 contains a pool of liquid metal coolant 14, such as sodium metal, with a heat producing core of fissionable fuel 16 substantially immersed within the liquid metal coolant pool 14 for heat transfer. Fission action of the fuel and the rate thereof is governed by neutron absorbing control rods 18 moving out from or into the fuel core 16.

The reactor vessel 12 is enclosed within a concentrically surrounding containment vessel 20 in spaced apart relation. This embodiment includes a collector cylinder 22 encircling substantially the length of the containment vessel 20 in spaced apart relation. A concrete silo 24 houses the concentrically combined and spaced apart arrangement of cylinder 22, containment vessel 20 and reactor vessel 12.

Preferably the concrete silo 24 is substantially buried into the ground to the extent that its contained reactor vessel 12 and adjoining vessels and cylinder are located at least below the ground surface, shown in the drawings as 26. Locating the liquid metal containing reactor vessel below ground surface precludes the escape of any liquid metal regardless of any loss of integrity of the plant. To preclude the loss and hazard of sodium from leakage due to breach of the reactor vessel, the reactor vessel is preferably enclosed within a spaced apart containment vessel with a sealed area therebetween filled with an inert gas such as argon. This arrangement of these combined components in surrounding or encircling and spaced apart positions, provides for their respective cylindrical side walls forming a series of partitions with intermediate spaces. Specifically, a space 28 between the side walls of concrete silo 24 and the collector cylinder 22 and a space 30 between the side walls of the collector cylinder 22 and containment vessel 20.

In a preferred embodiment of the invention wherein the above combined components are circular in cross-section and concentrically surround or encircle one another, the intermediate spaces 28, and 30 are each substantially annular in cross-section.

The space 28 intermediate between the concrete silo 24 and the collector cylinder 22 is in fluid communication with at least one duct 32 extended upwards beyond space 28 and terminating with an air intake opening 34 projecting into the atmosphere above ground level 26. The space 30 intermediate the collector cylinder 22 and the containment vessel 20 is in fluid communications with at least one duct 36 extending upwards beyond space 30 and terminating with an air outlet opening 38 projecting out into the atmosphere above ground level 26. Thus duct 32 with intake opening 34 and communicating space 28 form a downcomer fluid flow path, and space 30 and communicating duct 36 with outlet opening 38 form a riser fluid flow path. Spaces 28 and 30 also being in fluid communication at their lower most terminal whereby fluid can pass under and around the lower end of the collector cylinder 22, duct 32 with space 28 and space 30 with duct 36 provide a cycling fluid circuit 40 for the introduction and discharge of a gas coolant such as air.

The portion of cooling fluid circuit 40 comprising space 30 contacts the outer surface of the containment vessel 20. Thus, fuel decay generated heat passes from the fuel core 16 to the reactor vessel 12 by natural convection through the medium of the liquid sodium coolant 14. The conveyed heat is transferred from the warmer reactor vessel 12 to the cooler containment vessel 20 in part by thermal radiation. About 50 percent of the heat is in turn transferred from the outside surface of the wall of the containment vessel 20 to the collector cylinder 22 by thermal radiation and all heat is in turn transferred from the containment vessel and collector cylinder walls to gas such as air in space 30 adjoining said surface by natural convection. This heating of the gas contents of space 30 of cooling fluid circuit 40 induces a natural fluid convection current through cooling circuit 40. Thus, cool external ambient air enters intake 34 and traveling down though the duct 32 and space 28 downcomer, around the bottom of collector cylinder 22 and up through the riser formed by space 30 and duct 36 to outlet 38 for discharge out into the atmosphere, carrying heat absorbed from the surface of containment vessel 20 and collector cylinder 22 within space 30 which is dissipated out into the ambient atmosphere.

As such the cooling system is entirely passive and operates continuously by the inherent processes of natural convection and thermal radiation. Heat transferred from the reactor vessel, through a gas filled gap, is almost entirely by thermal radiation. Heat transferred from the containment vessel outer surface is partly, about 50 percent, by natural convection to the naturally convecting air flow in the heated riser duct 32, and partly, about 50 percent, by radiation to the collector cylinder 22.

Heat removal rate of this system increases with temperature and is controlled to a large degree by the thermal emissivity of the heat transfer surface more so in the gas gap between the reactor and containment vessels because of the dominance of radiative heat transfer there. Thus, this invention is concerned with increasing the thermal emissivity of the heat transfer surfaces whereby a greater decay heat load can be expelled by the system at any given reactor temperature.

In accordance with one aspect of this invention, specific heat transferring surfaces are modified to provide higher apparent thermal emissivity therein by the introduction of a roughened face texture over a significant surface portion. Heat is transferred from a roughened surface to a gas stream passing thereover by convection. Accordingly the face of heat dispensing surfaces contacting a gas flow are roughened by producing therein protrusions or cavities, and the like surface irregularities.

A specific embodiment of this invention comprises a method of heat transfer preparation for application to the heat carrying gas, such as air, contact surface of reactor structural components, commonly the outside surface of the containment vessel 20 wall and the inside surface of the collector cylinder 22 wall. The surface preparation methods of one embodiment produce a roughness on the face of these heat carrying gas contact surfaces of structural components by the formation of a plurality of protrusions with appropriate height and pitch as required to optimize convection heat transfer from the surface to the passing flow of gas.

Figure 3:
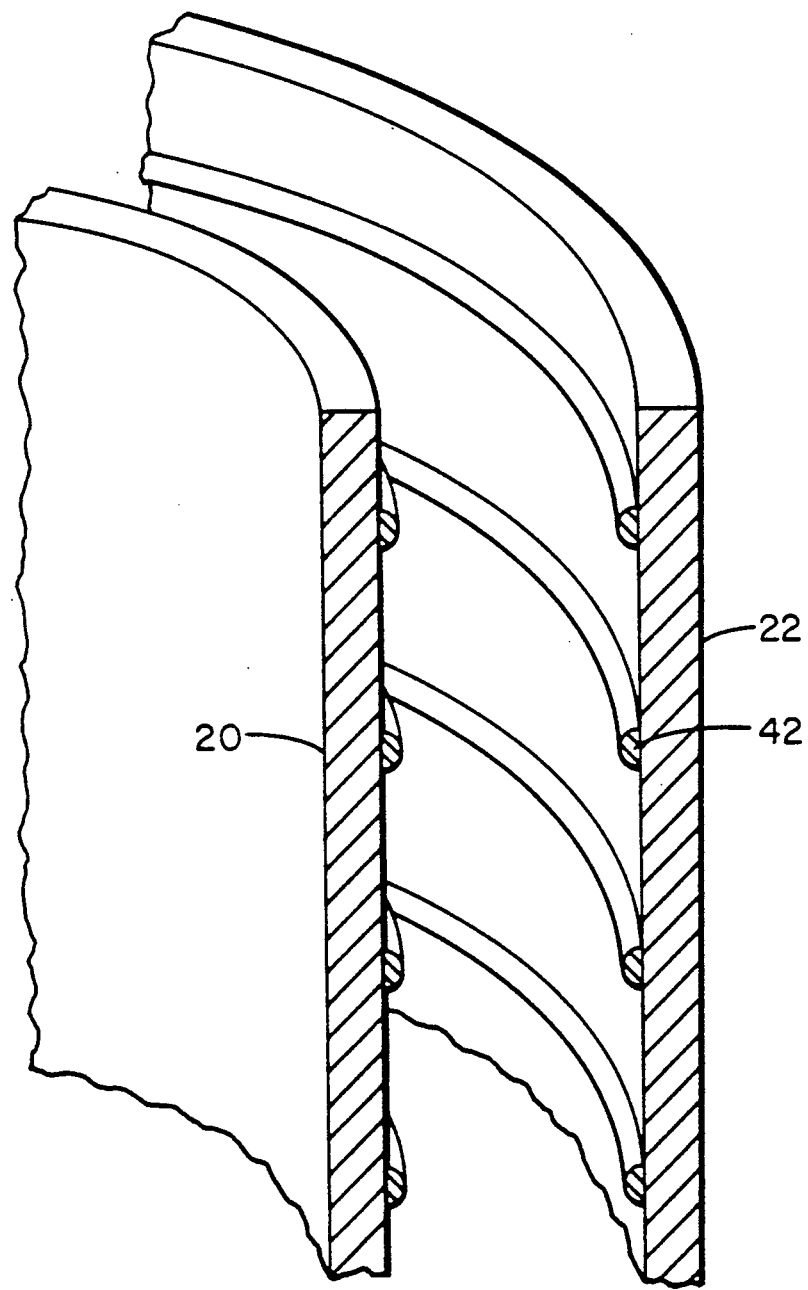
FIG. 3 is a perspective cross-section view of a portion of the composite side structure of the variation shown in FIG. 2.

Referring to FIGS. 2 and 3 of the drawing, one design of surface roughness provided on the outside surface of the containment vessel 20 wall and inside surface of the collector cylinder 22 wall defining space 30 of circuit 40 comprises a multiplicity of protrusion 42 of a height e and pitch p oriented in a direction substantially perpendicular to the direction of the gas flow thereover. Preferably, the protrusions 42 extend circumferencally around both circular walls of the concentric containment vessel 20 and collector cylinder 22 as shown in FIG. 3. Thus, the protrusions 42 comprise a multiplicity of parallel horizontal circular bands on each surface and projecting perpendicular to the path of gas which flows thereover.

Such circumferential protrusions, in accordance with the method of the inventions are produced by building up a weld deposit through one or more depositions of a weld formed bead around the circumference of the given vessel wall until the appropriate size and/or configuration is achieved. Suitable means comprise the submerged arc welding process, and it may be preferable to employ the same composition filler as the base metal alloy. The desired size and shape of the protrusions can be adjusted by selection of weld wire, feed rates, surface speed and number of passes.

For hardenable steel bases such as the 2.25 chronium-1.0 molybdium alloy commonly used in such reactor components, both a pre-heat and post-weld heat treatment is frequently needed for optimum results.

The multiplicity of circumferential protrusions 42 can readily be produced by rotating the vessel unit and repositioning the torch at the desired spacing distances along the length of the vessel unit. An alternative means comprises producing a helix-type or configurated protrusion on each vessel unit of suitable pitch by rotating the vessel unit while applying axial translation to the weld torch.

Another mode of producing the protrusions 42 of suitable design comprises welding metal strips of apt cross-sectioned configurations on to the face of the appropriate surfaces of the containment vessel and collector cylinder. In this process heat caused by resistance to the flow of electrical current in the work metal is combined with pressure to produce a welded seam consisting of a series of overlapping spot welds. A rotating circular electrode is pressed against the metal strip while an electrical current is directed through the metal at the point of contact. This method has the advantage that a post-weld heat treatment may not be needed.

Evaluations of the improvement in heat transfer performance attributable to this embodiment and the method therefor, were made for a roughness height of e equals 0.25 inches and a roughness pitch of p equals 6 inches for the protrusions. These studies show that the convective heat transfer coefficient on the metal surfaces of the vessel and cylinder can be increased by a factor of about 2. Although the gas flow rate over the protrusions is reduced by about 36 percent because of the higher friction for the configurations, the net heat transfer performance increases and results in a decrease in the maximum fuel core outlet temperature of 86 degrees F. for a reactor design transient.

Figure 4:
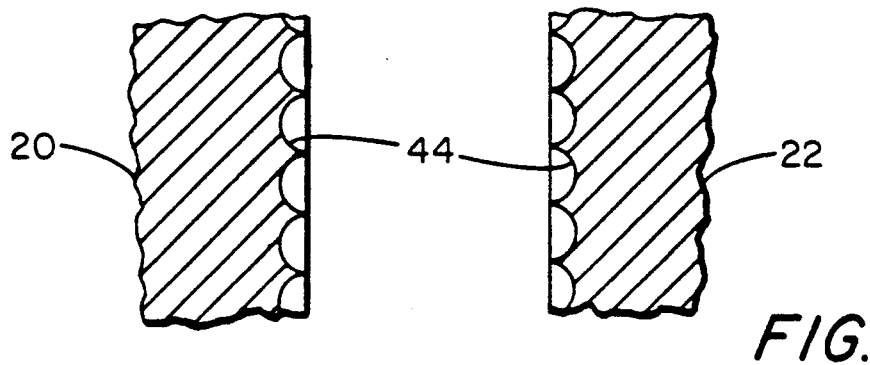
FIG. 4 is a cross-section view illustrating a modified surface area of vessel walls.
Figure 5:
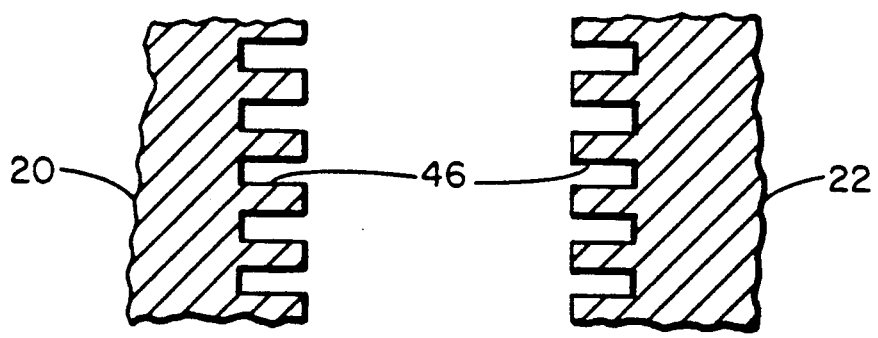
FIG. 5 is a cross-section view illustrating another modified surface area of vessel walls.

In another embodiment of this invention shown in FIGS. 4 and 5, cavities or indentations such as spherical dimples 44 depressions or axial grooves 46 are produced in the face of the surfaces of the containment vessel 20 and collector cylinder 22 contacting the gas flow in space 30. The characteristic dimensions of the cavities, either the sphere diameter or the groove width, can be of arbitrary size relative to the metal thickness and has no effect on the heat transfer performance. Also, other cavity configurations than those shown will suffice in enhancing heat transfer performance.

Evaluations of the improvements in heat transfer performance attributable to this embodiment indicate that the radiative heat flux can be increased about 28 percent for the dimple 44 configuration and about 45 percent for the groove 46 configuration at the same vessel surface temperatures and assuming that the metal surface emissivity of both surfaces is 0.7. The corresponding equivalent smooth surface emissivities, that is the surface emissivity required to achieve such an increase in heat flux, are 0.81 and 0.88 respectively. The evaluation shows that higher fractional increase in heat flux can be achieved when the metal surface emissivity is lower. Thus, with an assumed metal surface emissivity of 0.4, an increase in heat flux of about 54 percent was estimated for the dimple configuration and about 100 percent for the groove configuration. The corresponding equivalent smooth surface emissivity were 0.56 and 0.67 respectively.

These examples indicate that the use of surface roughening means and roughened configuration produce a more compact and economical design by increasing the apparent surface thermal emissivity and the corresponding reactor heat removing capacity.

What is claimed is:

1. A method of enhancing the thermal transfer effectiveness of a passive cooling system for liquid metal cooled nuclear reactors having a pool of liquid metal coolant with the heat generating fissionable fuel core substantially immersed in said pool of liquid metal coolant, the passive cooling system including a combination of spaced apart side-by-side partitions in generally concentric arrangement and providing for intermediate fluid circulation and heat transfer therebetween, including a reactor vessel for containing a pool of liquid metal cooling with a fuel core substantially immersed therein, a metal side wall of the reactor vessel forming an innermost first practitioner, a containment vessel substantially surrounding the reactor vessel in spaced apart relation having a metal side wall forming a second partition, a collector cylinder encircling the containment vessel in spaced apart relation having a metal side wall forming an outer third partition, a concrete silo substantially surrounding the containment vessel in spaced apart relation, a substantially circumferential circulating fluid flow course for circulation fluid coolant in a cycling path intermediate at least two of said partitions and opening to the atmosphere in an upper portion of the fluid flow course for expelling heat transported from the reactor vessel, said method of enhancing thermal transfer comprising producing a roughened surface on a portion of the face of the metal partition walls defining the substantially circumferentially circulating fluid flow course intermediate thereof for circulation of fluid coolant consisting essentially of providing a multiplicity of substantially horizontal circular protrusions projecting substantially perpendicular to the path of fluid flowing thereover to increase the convection heat transfer coefficient of the metal surface for greater heat removal capacity.

2. The method of enhancing the thermal transfer effectiveness of claim 1, wherein the roughened face produced on a metal surface portion of the partition walls comprises a plurality of spaced apart protrusions extending around the face of the partition walls.

3. The method of enhancing the thermal transfer effectiveness of claim 1, wherein the roughened face produced on a metal surface portion of the partition walls comprise protrusions formed by a multiplicity of cavities formed within the face of the partition walls.

4. The method of enhancing the thermal transfer effectiveness of claim 1, wherein the roughened face produced on a metal surface portion of the partition walls comprise a multiplicity of grooves formed within the face of the partition walls.

5. A method of enhancing the thermal transfer effectiveness of a passive cooling system for liquid metal cooled nuclear reactors having a pool of liquid metal coolant with the heat generating fissionable fuel core substantially immersed in said pool of liquid metal coolant, the passive cooling system including a combination of spaced apart side-by-side partitions in generally concentric arrangement and providing for intermediate fluid circulation and heat transfer therebetween, including a reactor vessel for containing a pool of liquid metal coolant with a fuel core substantially immersed therein, a metal side wall of the reactor vessel forming an innermost first partition, a containment vessel substantially surrounding the reactor vessel in spaced apart relation having a metal side wall forming a second partition, a collector cylinder substantially encircling the containment vessel in spaced apart relationship having an encircling metal wall forming an outer third partition, a concrete silo substantially surrounding the collector cylinder in spaced apart relation, a substantially circumferential circulating fluid flow course open to the atmosphere in an upper portion for circulating fluid coolant in a cycling flow circuit including downward intermediate the concrete silo and the third partition formed by the collector cylinder metal wall and back upward intermediate said third partition and the second partition formed by the containment vessel metal side wall, said method enhancing thermal transfer comprising producing a roughened surface substantially circumferentially around on a portion of the outer face of the second partition formed by the containment vessel metal side wall and the inner metal wall face of the third partition formed by the collector cylinder consisting essentially of providing a multiplicity of substantially horizontal protrusions projecting substantially perpendicular to the path of fluid flowing thereover to increase the convection heat transfer coefficient of the metal surface for greater heat removal capacity.

6. The method of enhancing the thermal transfer effectiveness of claim 5, wherein the roughened face produced on a portion of the metal surface of the second and third partition walls comprises a plurality of spaced apart protrusions extending substantially horizontally around the partition walls.

7. The method of enhancing the thermal transfer effectiveness of claim 5, wherein the roughened face produced on a portion of the metal surface of the second and third partition walls comprises protrusions formed by a multiplicity of cavities formed within the face of the partition walls.

8. The method of enhancing the thermal transfer effectiveness of claim 5, wherein the roughened face produced on a portion of the metal surfaces of the second and third partition walls comprises a multiplicity of grooves formed within the face of partition walls.

9. The method of enhancing the thermal transfer effectiveness of claim 5, wherein the roughened face produced on a portion of the metal surfaces of the second and third partition walls comprises welding a plurality of spaced apart protrusions extending substantially horizontal around the partition walls.

10. A method of enhancing the thermal transfer effectiveness of a passive cooling system for liquid metal cooled nuclear reactors having a pool of liquid metal coolant with the heat generating fissionable fuel core substantially immersed in said pool of liquid metal coolant, the passive cooling system including a combination of spaced apart side-by-side partitions in generally concentric arrangement and providing for intermediate fluid circulation and heat transfer therebetween, including a reactor vessel for continuing a pool of liquid metal coolant with a fuel core substantially immersed therein, a metal side wall of the reactor vessel forming an innermost first partition, a containment vessel substantially surrounding the reactor vessel in spaced apart relation having a metal side wall forming a second partition, a collector cylinder encircling the containment vessel in spaced apart relation having a metal side wall forming an outer third partition, a concrete silo substantially surrounding the collector cylinder in spaced apart relation, a substantially circumferential circulating fluid flow course for circulating fluid coolant in a cycling path including downward intermediate the concrete silo and the third partition formed by the collector cylinder wall and back upward intermediate said third partition wall and the second partition formed by the containment vessel side wall, said method of enhancing thermal transfer comprising welding a plurality of spaced apart generally horizontal protrusions on a portion of the outer face of the second metal partition formed by the containment vessel metal side wall and the inner face of the third metal partition formed by the collector cylinder, the weld formed generally horizontal protrusions extending circumferentially around and generally perpendicular to the faces of the partition walls and circumferentially around the containment vessel and collector cylinder said weld formed generally horizontal protrusions being substantially horizontal to the path of fluid flowing thereover to increase the convection heat transfer coefficient of the metal surface for greater heat removal capacity.

11. The method of enhancing the thermal transfer effectiveness of claim 10, wherein the spaced apart protrusions are formed by weld build-up utilizing the same composition filler metal as the metal partition walls.

12. The method of enhancing the thermal transfer effectiveness of claim 10, wherein the spaced apart protrusions are formed by welding metal strips to the metal partition walls.

13. A passive cooling system for liquid metal cooled nuclear reactors having a pool of liquid metal coolant with the heat generating fissionable fuel core substantially immersed in said pool of liquid metal coolant, the passive cooling system including a combination of spaced apart side-by-side partitions in generally concentric arrangement and providing for intermediate fluid circulation and heat transfer therebetween, including a reactor vessel for containing a pool of liquid metal coolant with a fuel core substantially immersed therein, a metal side wall of the reactor vessel forming an innermost first partition, a containment vessel substantially surrounding the reactor vessel in spaced apart relation having a metal side wall forming a second partition, a collector cylinder substantially encircling the containment vessel in spaced apart relation having a metal side wall forming an outer third partition, a concrete silo substantially surrounding the collector cylinder in spaced apart relation, a substantially circumferential circulating fluid flow course for circulating fluid coolant in a cycling path downward intermediate the concrete silo and the third partition formed by the collector cylinder metal wall and back upward intermediate said third partition metal wall and the second partition metal wall formed by the containment vessel side wall, a circumferentially around portion of the outer face of the second partition formed by the containment vessel side wall and a portion of the inner face of the third partition formed by the collector cylinder having a roughened surface consisting essentially of substantially horizontal protrusions projecting substantially perpendicular to the path of fluid flowing thereover to increase the convection heat transfer coefficient of the metal surface for greater heat removal capacity.

14. The passive cooling system for liquid metal cooled nuclear reactors of claim 13, wherein the roughened metal surfaces comprise a multiplicity of cavities providing intermediate protrusions.

15. The passive cooling system for liquid metal cooled nuclear reactors of claim 13, wherein the roughened metal surface comprises a multiplicity of grooves providing intermediate protrusions.

16. The passive cooling system for liquid metal cooled nuclear reactors of claim 13, wherein the roughened metal surface comprises a multiplicity of horizontally arranged spherical dimples.

17. A passive cooling system for liquid metal cooled nuclear reactors having a pool of liquid metal coolant with the heat generating fissionable fuel core substantially immersed in said pool of liquid metal coolant, the passive cooling system including metal coolant, the passive cooling system including a combination of spaced apart side-by-side partitions in generally concentric arrangement and providing for intermediate fluid circulation and heat transfer therebetween, including a cylindrical reactor vessel for containing a pool of liquid metal coolant with a fuel core substantially immersed therein and having a metal side wall of the reactor vessel forming an innermost first partition, a cylindrical containment vessel substantially surrounding the reactor vessel in spaced apart relation having a metal side wall forming a second partition, a collector cylinder substantially encircling the containment vessel in spaced apart relationship having a metal side wall forming an outer third partition, a cylindrical concrete silo substantially surrounding the collector cylinder in spaced apart relation, a substantially circumferential circulating fluid flow course for circulating a gas coolant in a cycling path downward intermediate the concrete silo and the third partition formed by the collector cylinder metal wall and back upwards intermediate said third partition metal wall and the second partition metal wall formed by the containment vessel side wall, a circumferentially around portion of the outer metal face of the second partition formed by the containment vessel side wall and a portion of the inner metal face of the third partition formed by the collector cylinder having roughened faces comprising weld produced protrusions extending generally perpendicular to the faces of the partition walls and running circumferentially around the cylindrical containment vessel and the collector cylinder consisting essentially of substantially horizontal protrusions projecting substantially perpendicular to the path of gas flowing thereover to increase the convection heat transfer coefficient of the metal surface for greater heat removal.

18. The passive cooling system for liquid metal cooled nuclear reactors of claim 17, wherein the roughened metal faces comprise protrusions formed by weld build-up.

19. The passive cooling system for liquid metal cooled nuclear reactors of claim 17, wherein the roughened metal faces comprise protrusions formed by welding metal strips to the surface of the partition walls.

20. The passive cooling system for liquid metal cooled nuclear reactors of claim 17, wherein the roughened metal faces comprise a multiplicity of horizontal spaced apart protrusions each extending circumferentially around the cylindrical containment vessel and the collector cylinder.

* * * * *